United States Patent [19]

Schnaus et al.

[11] Patent Number: 5,499,652
[45] Date of Patent: Mar. 19, 1996

[54] DISTRIBUTOR FOR VISCOUS FLUIDS WITH MULTIPLE RADIAL; DISCHARGE

[75] Inventors: Walter Schnaus, Rodenbach; Michael Streng; Franz Schoenmeier, both of Maintal; Stephan Biller, Oberursel, all of Germany

[73] Assignee: Zimmer Aktiengesellschaft, Germany

[21] Appl. No.: 356,141

[22] Filed: Dec. 15, 1994

[30]    Foreign Application Priority Data

Mar. 18, 1994 [DE] Germany ............... 44 09 234.2

[51] Int. Cl.$^6$ .................................................. F16K 49/00
[52] U.S. Cl. ..................... 137/340; 137/561 A; 137/883
[58] Field of Search ........................ 137/340, 561 A, 137/883; 251/129.11

[56]            References Cited

U.S. PATENT DOCUMENTS

| | | | |
|---|---|---|---|
| 2,994,338 | 8/1961 | Wilson | 137/340 |
| 3,724,492 | 4/1973 | Itter | 137/597 |
| 4,299,553 | 11/1981 | Swaroup | 137/561 A |
| 4,593,716 | 6/1986 | Cesna | 137/561 A |
| 5,010,910 | 4/1991 | Hickey | 137/561 A |
| 5,269,348 | 12/1993 | Schnaus et al. | 137/883 |

FOREIGN PATENT DOCUMENTS 2700564   7/1994   France ................... 137/883

*Primary Examiner*—A. Michael Chambers
*Attorney, Agent, or Firm*—Banner & Allegretti, Ltd.

[57]            ABSTRACT

Distributors for viscous fluids, consisting of a central inlet line and at least two valves that are connected radially to the inlet line, each valve having one valve spindle that moves in the axial direction in the cylindrical valve casing and an outlet opening that opens into an outlet line, whereby a flow displacer having a cylindrical bottom part and a conical top part is inserted centrally into the inlet line at the level of the valves, forming a ring gap, and where the cross section of flow is constricted in the outlet opening and then immediately thereafter is enlarged in the outlet line.

9 Claims, 4 Drawing Sheets

FIG. 5a
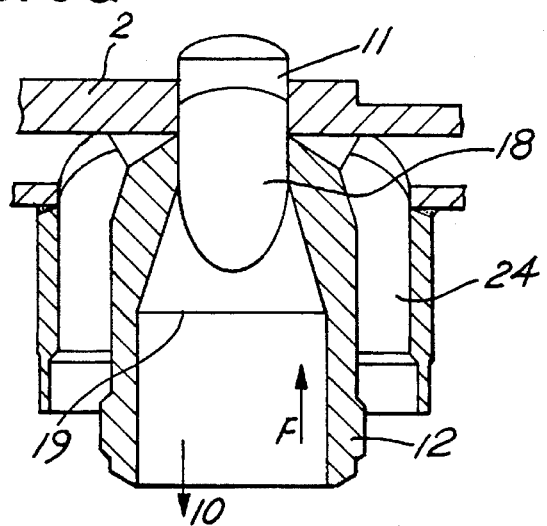
FIG. 5b
FIG. 6
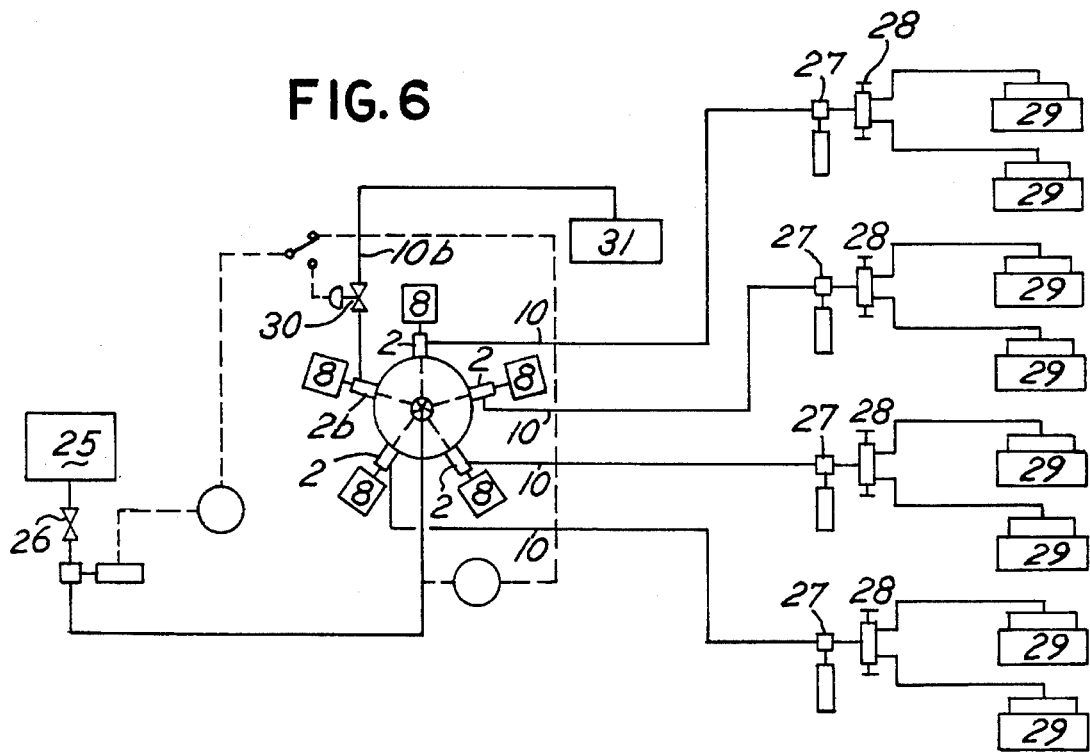

DISTRIBUTOR FOR VISCOUS FLUIDS WITH MULTIPLE RADIAL; DISCHARGE

This invention concerns a distributor for viscous fluids which includes a central inlet line and several outlet lines each fitted with a valve. This invention specifically concerns a device for distributing a polymer melt to a number of melt spinning units or comparable extrusion units.

BACKGROUND OF THE INVENTION

In producing filaments or similar products, a polymer melt that is supplied through a single line coming from the polycondensation reactor or a chip melting device must be distributed uniformly to a number of spinning units or comparable extrusion units. Dead spots within the distributor should be avoided as much as possible and the product must not stagnate in the distributor when there are temporary interruptions in production because if the dwell time of this polymer is prolonged, it will result in thermal decomposition of the polymer, which thus leads to insoluble cross linked products.

PRIOR ART

The distributor described in U.S. Pat. No. 3,724,492 consists of a central inlet line that is connected through several radial lines to a self-contained ring line where the polymer melt is discharged through a number of three-way valves arranged asymmetrically with the radial lines in the ring line. This arrangement presupposes complex relationships between the melt pressure and the design of the distributor lines when the valves are opened, which makes it very difficult to adapt to melts having different flow properties. The total volume of the distributor lines is relatively large, which leads to a correspondingly large amount of thermally damaged product that must be removed whenever the dwell time has been prolonged due to partial or complete closure of the valves.

With the distributor according to U.S. Pat. No. 5,269,348, these disadvantages are eliminated by means of a direct connection of two-way valves with a specially designed valve head and guide cylinder to the central inlet line. A small portion of the product must continuously be sent not to the distributor valves but instead to a collecting tank with a product return line or to an additional pelletizing device, but this is not desirable in all cases.

SUMMARY OF THE INVENTION

The object of the present invention is to make available a distributor for viscous fluids with multiple radial outlets that does not have the aforementioned disadvantages or at least has them to a lesser extent. In particular, the distributor should have a small volume and should not have any dead spots, and the entire product should be discharged to the further processing units through the distributor valves during operation.

This distributor consists of a central inlet line and at least two outlet valves, preferably 3 to 8 outlet valves connected radially to it, where each valve has a valve spindle with a valve head that moves in the axial direction of the valve and also has an outlet line. Valve seats are installed in the wall of the inlet line where the valve heads, which are preferably disk-shaped valve heads, engage, and thus the valves interrupt the flow from the inlet line to the outlet lines leading away from the valves. In the open position, the base of the valve head must leave free the opening to the outlet line in the valve casing, while the disk-shaped top side of the valve head projects into the flow. The valve seats are disposed at the same level and arranged symmetrically around the inlet line.

According to this invention, a flow displacer with a cylindrical bottom part and a conical top part facing the liquid flow is provided in the central line at the level of the valve seats, forming a concentric ring gap or annular gap between the outside wall of the flow displacer and the inside wall of the inlet line. The height g of the cylindrical bottom part is approximately equal to the diameter e of the valve seats, or more precisely, $g=(1.0 \text{ to } 1.1) \cdot e$, preferably $g=e$. The total height h of the flow displacer is at least equal to the inside diameter f of the displacer-free area of the central inlet line, more specifically $h=(1.0 \text{ to } 1.3) \cdot f$, preferably $h=1.15 \cdot f$.

In the central area of the bottom part of the displacer, the width k of the ring gap is constant, where $k=(0.10 \text{ to } 0.25) \cdot f$, preferably $k=0.19 \cdot f$. The ring gap at the base of the cylindrical bottom part of the displacer is preferably slightly rounded or beveled in order to prevent a dead angle. In the area of the conical top part of the displacer, the ring gap is enlarged in the manner of a funnel on the incoming flow end, such that the gap width increases gradually from k to f/2. The ring gap in combination with the flow displacer results first in acceleration of the fluid flow and second in minimizing the liquid volume in this area. Due to this fact, an adequate flushing effect of the distributor area is achieved especially when some of the distributor valves are closed temporarily, thus preventing dead zones from developing. In the event all the valves are closed, the amount of liquid remaining in the distributor that might undergo thermal degradation is small and thus can be removed rapidly without any great losses when operation is resumed.

Another feature according to this invention is that the diameter a of the opening to the outlet line is smaller than the inside diameter b of the cylindrical valve casing, where $a=(0.5 \text{ to } 0.7) \cdot b$, preferably about $0.6 \cdot b$. Immediately following this, the outlet line widens to the diameter d, where d is of the same order of magnitude as b and $d=(1.4 \text{ to } 1.9) \cdot a$, preferably approximately $1.65 \cdot a$. The length c of the transition zone from the diameter a to the diameter d is $c=(0.8 \text{ to } 1.5) \cdot a$, preferably about $1.33 \cdot a$. As the result of this narrowing of the cross section followed by an increase in cross section, a suction effect is created in the area of the outlet line next to the valve casing, so this compensates for the tendency of the liquid to stagnate in the zone of the top part of the valve head opposite the outlet line.

The distributor according to this invention can be used for any type of viscous fluid that is to be distributed selectively from a single incoming line to a number of outlet lines. The gap width k and the ratio a:b will be larger, the greater the viscosity of the liquid. A preferred use of this invention is for distributing a polymer melt to a number of extrusion positions or melt spinning units. Examples of such polymers include polyethylene terephthalate, polybutylene terephthalate, nylon 6, nylon 6,6, polyolefins and copolymers thereof. In this case the distributor including the flow displacer and the polymer lines must be heated by one or more heating jackets where a suitable heating medium circulates. Other types of heating such as heating strips may also be used.

THE DRAWINGS

This invention will now be described in conjunction with the drawings in which:

FIG. 5a is a section through an outlet line near the valve.

FIG. 5b is an end view showing the oval configuration of the central section of the outlet.

FIG. 6 is a flow chart of a production plant with a polymer melt producing unit and the distributor according to this invention having five outlet valves, four of which are connected to spinning units and one of which is connected to a pelletizing device.

DETAILED DESCRIPTION

Figure 1:
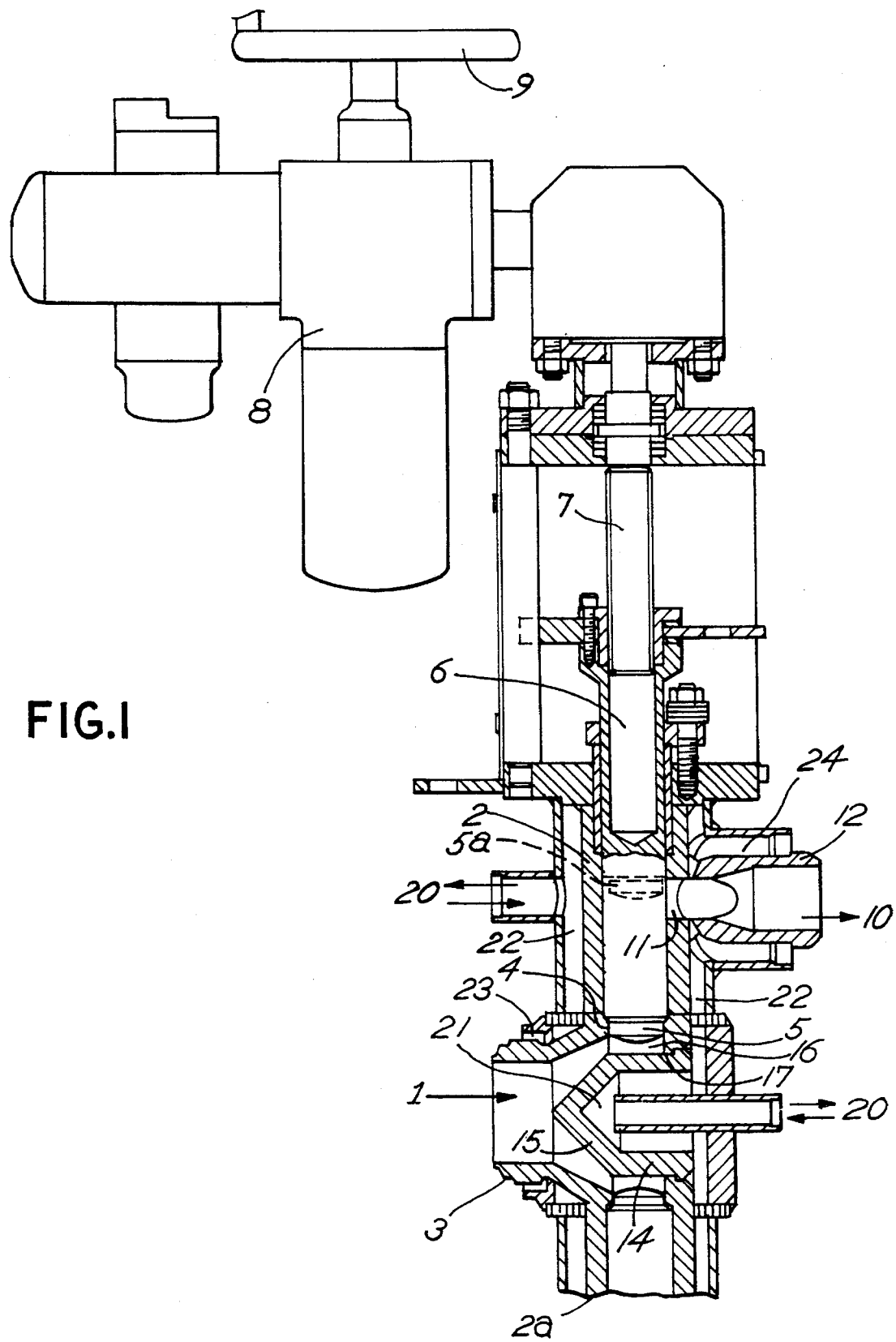
FIG. 1 is a longitudinal section through a distributor valve connected to a motor according to this invention showing the valve in closed position and in dotted lines in open position.

FIG. 1 shows a valve that has a valve casing 2 and an outlet line 10 and is connected radially to the central inlet line 1. This figure also shows partially a second valve 2a. The valve spindle 6 with valve head 5 is connected to the drive spindle 7 and the latter is connected to the drive motor 8 with the control wheel 9 which moves the valve spindle 6 from the closed position 5 to the open position 5a.

A flow displacer 14, 15 is installed centrally in the central inlet line 1 at the level of the valve seats 4, forming ring gap 16. The central line 1 may be somewhat enlarged, as shown here, in the area of the flow displacer 14, 15, which is expedient especially when there are several outlet valves 2 per distributor. In this case, an even better flushing effect is achieved due to the inclined position of the funnel-shaped gap area which is oriented toward the valves. The entire distributor can be heated, so a liquid heating medium is sent through the interior 21 of the flow distributor and the heating jackets 22, 23 and 24 of the valve via the inlet line and the outlet line 20 (second line not visible in the longitudinal sectional view). If the liquid to be distributed flows freely at room temperature, no heating is necessary.

The liquid or polymer melt flowing into the distributor at 1 is distributed uniformly from the conical top part 15 of the flow displacer to the concentric ring gap 16 and passes through the cylindrical interior of the valve casing 2 through opening 11 in the wall of the valve casing 2 to the outlet line 10 when the valve is opened (valve head position 5a). Based on the direction of flow in inlet line 1, the flow inside the valve casing 2 is radial and the flow in the outlet line 10 is parallel or almost parallel in the case of a slightly inclined line 10.

Figure 2:
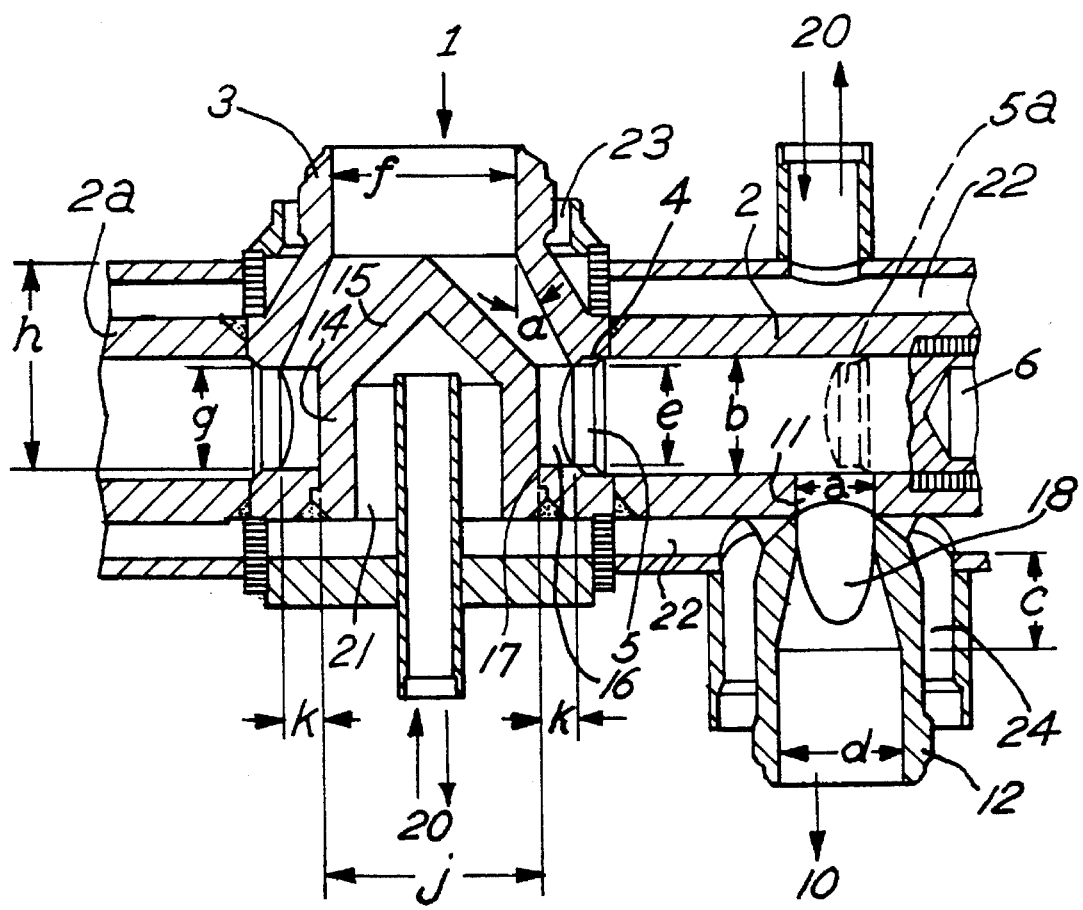
FIG. 2 is an enlarged longitudinal section of a portion of the valve in FIG. 1 marked to show the geometric relationship of the cooperating elements.

All other details are shown on an enlarged scale in FIG. 2 and are explained in greater detail below with reference to FIG. 2.

Preferably the inlet line 1 with an inside diameter of f is enlarged gradually in the direction of flow immediately upstream from the valve seats 4, in which case the wall 3 forms an angle ($\alpha$) in the range of 15° to 30°, preferably about 25° to the axis of the inlet line in the area of the top part 15 of the displacer. At the level of the bottom part 14 of the displacer, the inside diameter of the inlet line is constant and equates to $(j+2k)=(1.35 \text{ to } 1.75)\cdot f$, preferably about $1.5\cdot f$, where j is the outside diameter of the bottom part of the displacer.

The flow displacer 14, 15 is inserted centrally into this area of inlet line 1. The height g of the cylindrical bottom part 14 is approximately equal to the diameter e of the valve seats 4, while the height of the conical top part 15 corresponds to the length of the area of the inlet line where the diameter increases gradually. The tip of the cone may be slightly rounded or flattened. For fluids that are free-flowing liquids at room temperature, the displacer may be solid. Preferably, however, the displacer is hollow, and is heated through hollow space 21 by means of a heating medium that is introduced and removed at 20.

The width k of the ring gap 16 between the bottom part 14 of the displacer and the inside wall of the enlarged inlet line or valve head 5 when the valve is closed should be as small as possible in order to assure a high acceleration of flow and a small liquid volume while on the other hand it should be large enough to prevent stagnation of fluid. The liquid pressure in the inlet line and the viscosity should be taken into account accordingly in the design. In general, $k=(0.10 \text{ to } 0.25)\cdot f$, where k is preferably approximately $0.19\cdot f$ in the case of polymer melts. In large-scale industrial polymer plants, k is in the range of 10 to 20 mm.

When the liquid arrives at 1, it is distributed uniformly through cone 15 to the ring gap 16, where the funnel-like inlet zone provides uniformity of flow through the entire cross section. The base of the flow displacer is rounded or beveled adjacent said ring gap 16. A radius of about 3 to 5 mm has proven suitable. This prevents stagnation of the liquid in the angle area 17. After passing through the valve seat opening 4, liquid flows within the cylindrical valve casing 2 to the outlet opening 11 and then flows further to outlet line 10.

In the open valve position, the valve spindle 6 leaves the outlet opening 11 free, while valve head 5a projects into the flow of fluid. In order to assure an adequate flow or rinsing effect on the side of the valve head 5a opposite the opening 11, the cross section of flow a is at first greatly restricted in the area of opening 11 and then is greatly enlarged again to d within a very short distance c. This accelerates the velocity of flow in the area of outlet opening 11.

The transition from cross section a to cross section d takes place gradually in any desired manner—for example, in the shape of a funnel or, as shown here, by way of an intermediate zone having an oval cross section 18. The rinsing effect achieved as a result of these changes in cross section is somewhat better with an intermediate zone having an oval cross section than with a zone having a circular cross section. In any case, however, it is essential for the transition to take place within a short distance c.

Figure 3:
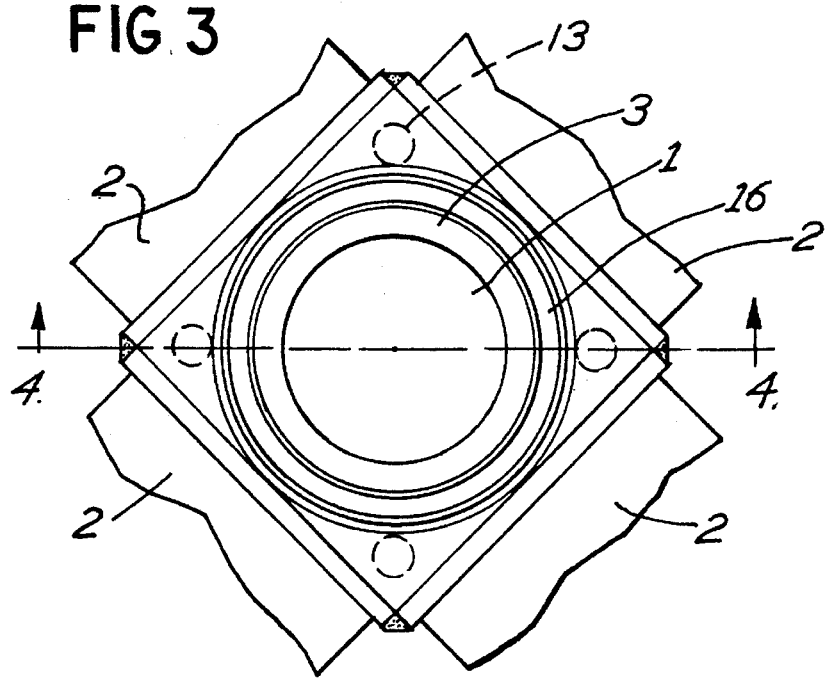
FIG. 3 is a plan view of the central inlet line with the flow displacer installed as well as four radial outlet valves (shown only partially).

FIG. 3 is a top view of a distributor having an enlarged central inlet line 1 and an installed flow displacer 14, 15 as well as four radial outlet valves 2 that are shown only partially here. Heating channels are labeled as 13.

Figure 4:
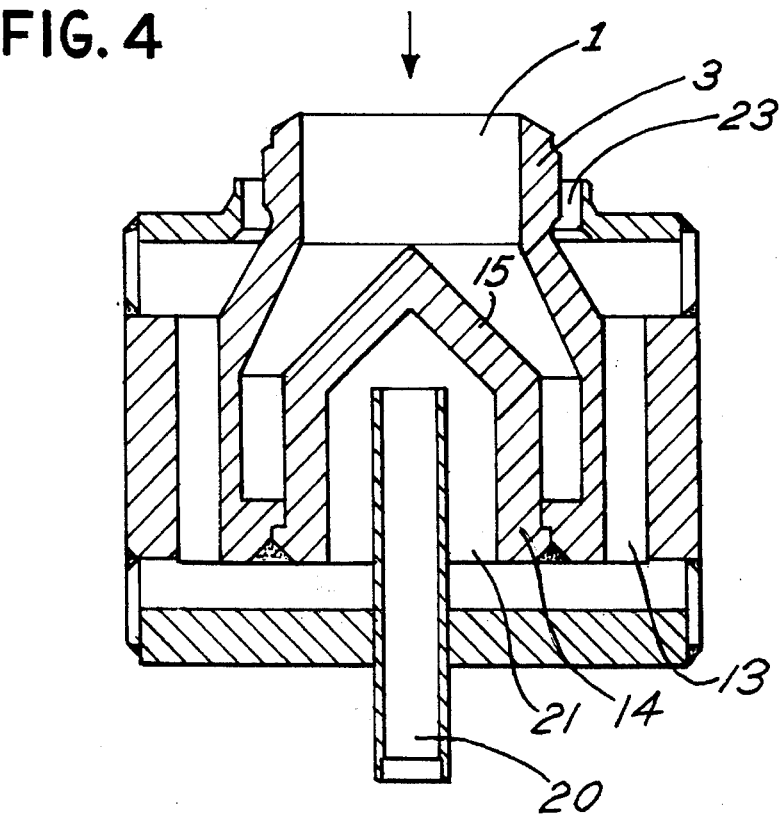
FIG. 4 is a section taken along the line A—A of FIG. 3.

FIG. 4 is section A—A through the distributor according to FIG. 3. In comparison with FIG. 2, this sectional view is offset by 45° relative to the plane of the valve. This figure shows clearly the hollow spaces 21 and 23 through which the liquid heating medium flows.

FIG. 5 is an enlarged scale longitudinal section through the area of the outlet line 10 near the valve (FIG. 5a) and a cross-sectional view of the same area (FIG. 5b). The cross section of flow increases directly after the circular outlet opening 11 of valve casing 2 in the direction of flow, where the transitional zone first develops into an oval cross section 18 and then leads to the maximum circular cross section 19. The inside diameter of the outlet line 12 connected to the latter may also be slightly smaller than the maximum diameter 19. This is determined by purely structural factors and is of no relevance for the present invention.

FIG. 6 shows a flow chart of a spinning plant with a distributor according to this invention. The polymer melt flows from a polymer melt generating unit 25 such as a polymerization reactor or a pellet melting device through the control valve 26 to the distributor which is fitted with five outlet valves 2, each of which is operated by a motor 8. Four of the outlet valves 2 are connected by way of outlet lines 10 to spinning units 29, where a spinning pump 27 and a control valve 28 are connected upstream from each spinning unit 29. The fifth outlet valve 2b is connected via outlet line 10b and control valve 30 to the granulation unit 31 or a collecting tank.

In trouble-free operation of the spinning units 29, the distributor valve 2b remains closed and after being distributed to the four outlet valves 2, all of the polymer melt that is sent to the distributor through line 1 flows through the outlet lines 10 to the spinning units 29. Similarly, when there is a temporary shutdown in one or up to three of the four spinning units 29—for example, when there is a thread break—the polymer melt is sent to the remaining functional spinning units 29 after an appropriate reduction in the melt flow rate by means of the control valve 26. The small volume of the ring gap 16 assures a sufficient velocity of flow to flush out the entire distributor so it is possible to spin all of the polymer without any negative effects on quality. It is not necessary to remove any of the polymer melt as waste as long as at least one spinning unit 29 is in operation.

When there is a brief failure of all spinning units 29, the respective distributor valves 2 are closed and instead the fifth outlet valve 2b is opened after actuation of the control valve 30. In this case, all the polymer goes through outlet line 10b to the discharging unit 31, which may be a pelletizing unit or a melt collecting tank. This prevents any stagnation or thermal degradation of polymer melt in the distributor. The pellets produced in the unit 31 during the interruption in spinning operation and the polymer melt collected in the collecting tank can be recycled back to the process without any loss of quality or can be used elsewhere.

When processing fluids that have a lower thermal sensitivity, all the distributor outlet valves 2 may be connected to the consumer units. In the event of a temporary failure of all consumer units, all the distributor outlet valves are closed. The amount of fluid remaining in the distributor is small in accordance with the small inside volume of the distributor, so that brief flushing of the distributor is sufficient when resuming operation.

We claim:

1. In a distributor for viscous fluids, consisting of a central inlet line with an inside diameter of f and at least two valves connected radially to said inlet line, each valve having a cylindrical casing with an inside diameter of b, an outlet opening that opens into an outlet line and a valve spindle having a valve head that moves in the axial direction in said casing, said spindle serving to close off said valve, and said valve head engaging a valve seat having a diameter of e in the wall of said inlet line when the valve is in the closed position, said valve spindle leaving said outlet opening just free when the valve is in the open position, the improvement comprising a flow displacer of the height h with a cylindrical bottom part having the height g and a conical top part facing the fluid flow inserted centrally into said inlet line in the area of said valve seat to form a ring gap of the width k around the bottom part of said displacer, where $g = (1.0 \text{ to } 1.1) \cdot e$ $h = (1.0 \text{ to } 1.3) \cdot f$ and $k = (0.10 \text{ to } 0.25) \cdot f$ said outlet line being enlarged along a length c to an inside diameter of d immediately following said outlet opening, which opening has a diameter of a, where $a = (0.5 \text{ to } 0.7) \cdot b$ $d = (1.4 \text{ to } 1.9) \cdot a$ and $c = (0.8 \text{ to } 1.5) \cdot a$.

2. Distributor according to claim 1, in which said inlet line is enlarged in comparison with f in the area of the flow displacer, the wall of said inlet line forming an angle ($\alpha$) in the range of 15° to 30° relative to the axis of said inlet line in the area of said conical top part of said displacer, and said enlarged inside diameter of the inlet line being constant in the area of said bottom part of the displacer.

3. Distributor according to claim 2 in which the following approximate relationships hold:

$g = 1.0 \cdot e$ $h = 1.15 \cdot f$ $k = 0.19 \cdot f$ $a = 0.6 \cdot b$ $d = 1.65 \cdot a$ $c = 1.33 \cdot a$ and $\alpha = 25°$.

4. Distributor according to claims 1 or 3, in which said outlet line has an oval cross section in the area between the circular cross sections a and d.

5. Distributor according to claim 1 in which the base of the bottom part of said displacer is rounded off or beveled adjacent said ring gap.

6. Distributor according to claim 1 in which the distributor is surrounded by at least one heating jacket and said flow displacer has an interior cavity, said heating jacket and said cavity being connected to a liquid heating medium circuit.

7. Distributor according to claim 1 in which said central inlet line is connected radially to at least 3 and up to 8 symmetrically arranged valves.

8. Distributor according to claim 7 in which one of said valves is connected to a discharging unit and the other valves are each connected to a processing unit.

9. Distributor according to claim 8 in which said processing unit is a spinning unit.

* * * * *